March 7, 1961   P. R. JACKSON   2,973,561
PANEL MOUNTED FOR MOVEMENT BETWEEN A VERTICAL POSITION, A
HORIZONTAL POSITION, AND A POSITION
EXTENDED HORIZONTALLY THEREFROM
Filed March 2, 1959   4 Sheets-Sheet 1

INVENTOR.
PAUL R. JACKSON

INVENTOR.
PAUL R. JACKSON

March 7, 1961

P. R. JACKSON 2,973,561

PANEL MOUNTED FOR MOVEMENT BETWEEN A VERTICAL POSITION, A
HORIZONTAL POSITION, AND A POSITION
EXTENDED HORIZONTALLY THEREFROM

Filed March 2, 1959

INVENTOR.

PAUL R. JACKSON

March 7, 1961 P. R. JACKSON 2,973,561
PANEL MOUNTED FOR MOVEMENT BETWEEN A VERTICAL POSITION, A
HORIZONTAL POSITION, AND A POSITION
EXTENDED HORIZONTALLY THEREFROM
Filed March 2, 1959 4 Sheets-Sheet 4

INVENTOR.
PAUL R. JACKSON

United States Patent Office 2,973,561
Patented Mar. 7, 1961

2,973,561
PANEL MOUNTED FOR MOVEMENT BETWEEN A VERTICAL POSITION, A HORIZONTAL POSITION, AND A POSITION EXTENDED HORIZONTALLY THEREFROM

Paul R. Jackson, Pico, Calif., assignor of one-tenth to Gadget-Of-The-Month Club, Inc., North Hollywood, Calif., a corporation of California Filed Mar. 2, 1959, Ser. No. 796,615

8 Claims. (Cl. 20—16)

The present invention consists of a panel mounted with respect to a structure for pivotal movement between a vertical position and an upper horizontal position and horizontally extendable therefrom. In one preferred form, the panel may comprise a door or wall and the structure may comprise a garage or other building having two spaced sidewalls on each side of an opening therebetween and pivotally mounting the door or wall for movement between a vertical position wherein it acts as a third sidewall extending across said opening perpendicular to the other two sidewalls, and an upper horizontal position lying inside the garage or building and below the roof thereof; said movable door or wall being controllably horizontally extendable from said upper horizontal position outwardly through the opening in which it is located when in said vertical position, whereby to provide a cantilever-type projecting or overhanging roof structure extending over an adjacent area outside of said garage or building.

It is an object of the present invention to provide an improved panel and mounting apparatus therefor of the character set forth above and including a substantially rectangular frame member consisting of two horizontally spaced parallel side receiving channel portions open at first ends thereof and defining an opening into the frame member, and a transverse receiving channel portion interconnecting second ends thereof to define a closed end of said frame member, with said horizontally spaced side receiving channel portions normally receiving through said open end of said frame member and engaging corresponding horizontally spaced side edges of a substantially flat rectangular panel member whereby to effectively mount same extending between said horizontally spaced side receiving channel portions for controllable slidable extension partially out of said open end of said frame member; said frame member being provided with pivotal mounting means adapted to effectively pivotally mount same about a horizontal axis with respect to a structure, which might be a building, garage, or other equivalent structure, for movement of the engaged frame member and panel member between a vertical position and an upper horizontal position; said horizontally spaced receiving channel portions of said frame member carrying frame locking means adjacent said open end thereof and controllably projecting horizontally therefrom into corresponding fixed receiving recess means adapted to be carried by an adjacent portion (or adjacent portions) of the structure, building, or garage when said engaged panel member and frame member are in said upper horizontal position and said panel member is extended horizontally through said open end of said frame member to a predetermined degree, whereby to effectively support in cantilever fashion said extended panel member with respect to said structure, building, or garage.

It is a further object to provide apparatus of the character set forth in the preceding object, wherein the frame locking means includes horizontally outwardly directed projection means slidably positioned in corresponding outwardly directed aperture means defined by said horizontally spaced side receiving channel portions, and also includes resilient spring-cam follower means mounting said projection means normally spaced inwardly of said side receiving channel portions for abutment by said edges of said panel member when it is slidably extended through said open end of said frame member.

It is a further object to provide apparatus of the character set forth in the preceding object, wherein the side edges of the panel member have recess means in portions thereof adjacent to said spring-cam follower means when the panel member is fully inserted through the open end of the frame thereinto, whereby to allow said spring-cam follower means to retract inwardly said projection means, thus releasing said frame member from the fixed receiving recess means carried by adjacent portions of the structure, building, or garage and allowing the assembled panel member and frame member to be pivotally moved between the upper horizontal position and the vertical position previously referred to.

It is a further object to provide apparatus of the character set forth in the preceding object, wherein the panel member is provided with manually controllably operable fastening means releasably fastening the panel member in fully inserted position within the frame member.

It is a further object to provide apparatus of the character set forth in the preceding object, wherein the manually controllably operable fastening means includes a controllably extendable handle for use in moving the panel member from its normal upper horizontal position horizontally outwardly into its extended cantilever or overhanging position.

It is a further object to provide apparatus of the character set forth in any of the preceding objects, which is of such simple, cheap, foolproof construction as to be conducive to widespread use thereof.

Further objects will be apparent to persons skilled in the art after a careful study hereof.

For the purpose of clarifying the nature of the present invention, one exemplary embodiment is illustrated in the hereinbelow-described figures of the accompanying four sheets of drawings, and are described in detail hereinafter.

Figure 13:
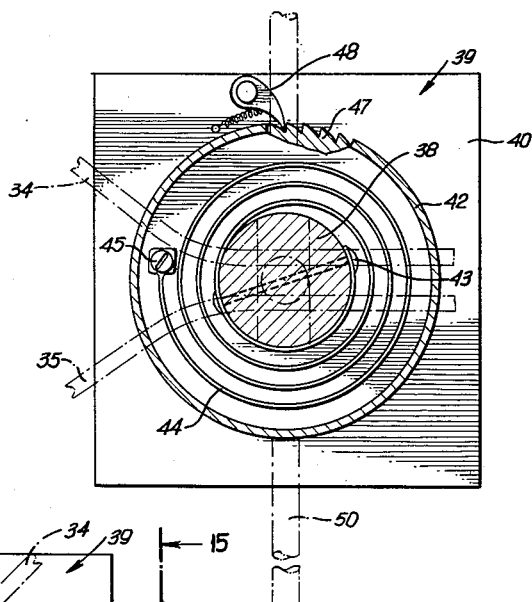

Fig. 13 is a fragmentary view, partly in vertical section and partly in elevation, showing one specific form of spring means for biasing upwardly the pivotal mounting means interconnecting the door and the garage, wherein said spring means is so constructed as to provide for controllable adjustment of the force exerted thereby on the pivotal mounting means and the door. This view shows the spring means in the position which it assumes when the door is in the vertical position illustrated in Figs. 1 and 4.

Figure 3:
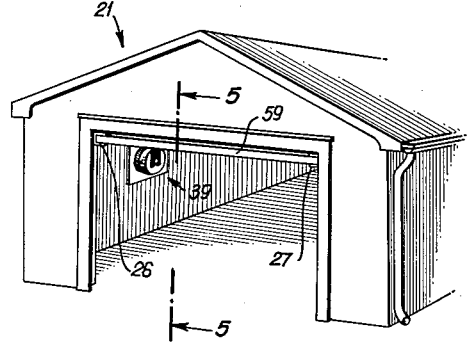
Fig. 3 is a perspective view similar to Figs. 1 and 2 but shows the door in an upper horizontal position.
Figure 5:
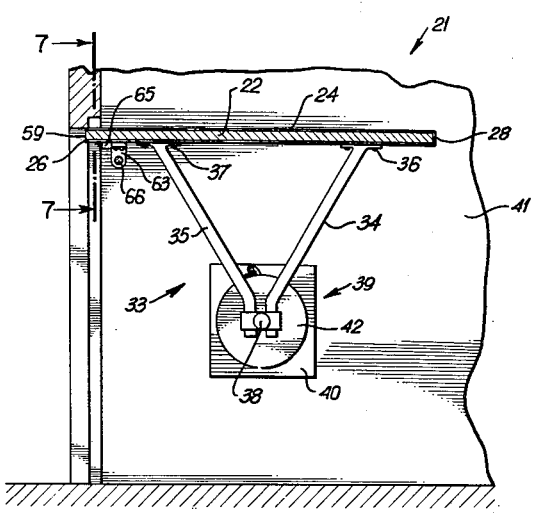
Fig. 5 is a fragmentary partly vertical sectional view taken in the direction of the arrows 5—5 of Fig. 3.
Figure 14:
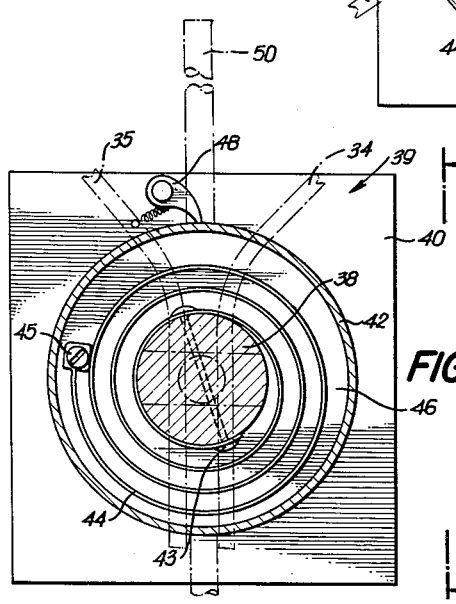

Fig. 14 is a view similar to Fig. 13, but shows the spring means in the position which it assumes when the door is in the upper horizontal position shown in Figs. 3 and 5.

Figure 15:
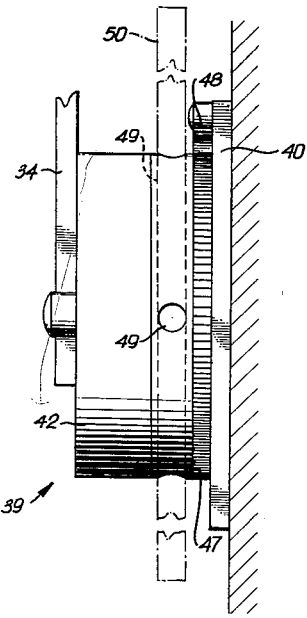

Fig. 15 is a fragmentary view showing certain details of the means for controllably adjusting the tension of the spring means shown in Figs. 13 and 14.

Figure 16:
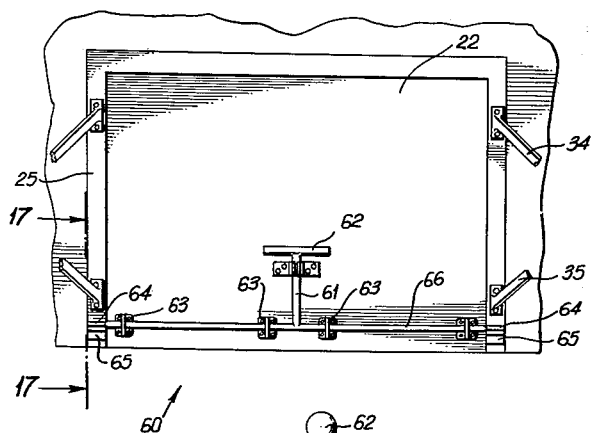

Fig. 16 is a reduced-size fragmentary view showing certain details of manually controllably operable fastening means for releasably fastening the panel member in fully inserted position within the frame member.

Figure 17:
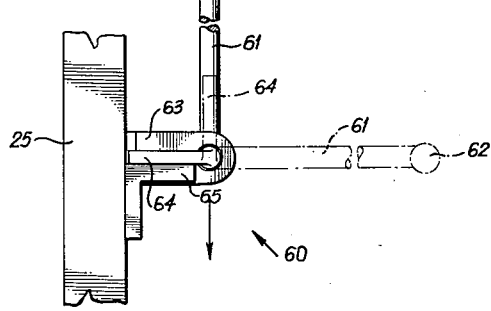

Fig. 17 is a fragmentary view of a portion of Fig. 16, drawn to a larger scale, and taken in the direction of the arrows 17—17 of Fig. 16.

Figure 11:
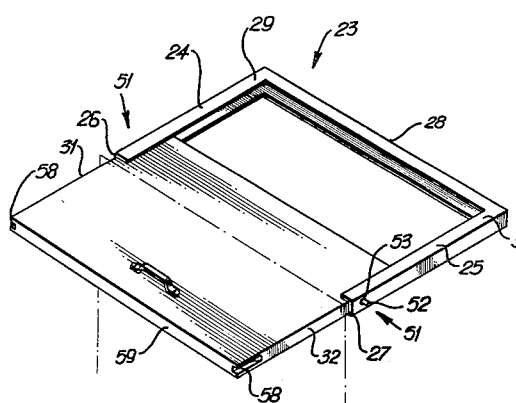
Fig. 11 is a reduced-size perspective view of the door when the panel member is in the horizontally extended cantilever position with respect to the frame member as shown in side section in Fig. 6. It should be noted that other portions of the apparatus are removed from this view for reasons of drawing simplification.

In the specific embodiment of the invention illustrated, the above-mentioned panel takes one specific form wherein it comprises a door, indicated generally at 20, and the above-mentioned structure carrying same takes one specific form wherein it comprises a garage, indicated generally at 21. In the specific example illustrated, the door 20 comprises a substantially flat rectangular panel member 22 carried by a substantially rectangular frame member, indicating generally at 23 (best seen in Fig. 11), and consisting of two horizontally spaced parallel side receiving channels 24 and 25 open at first ends 26 and 27, respectively, and defining an opening into the frame member 23, and also including a transverse receiving channel portion 28 interconnecting second ends 29 and 30, respectively, of said side receiving channel portions 24 and 25, whereby to define a closed end of said frame 23. In the specific example illustrated, the horizontally spaced side receiving channel portions 24 and 25 normally receive through the open end of the frame correspondingly spaced side edges 31 and 32 of the panel member 22 whereby to effectively mount same extending between the horizontally spaced side receiving channels 24 and 25 in a manner adapted for controllable slidable extension partially out of said side receiving channels 24 and 25 to an extended cantilever position such as that shown fragmentarily in Fig. 11.

Figure 4:
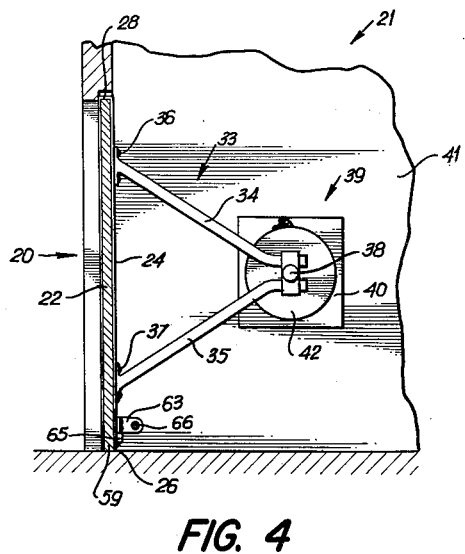
Fig. 4 is a slightly larger scale fragmentary partly vertical sectional view taken in the direction of the arrows 4—4 of Fig. 1.

The frame member 23 is provided with pivotal mounting means, which in the example illustrated takes one specific form, as indicated generally at 33 comprising two structural members 34 and 35 connected at front ends thereof, as indicated at 36 and 37, respectively, to the side receiving channel portion 24 and connected at rear ends thereof to pivot pin means 38, which in turn is connected through controllable tension-adjustable spring means, indicated generally at 39, to a fixed mounting plate 40, which is adapted to be fixedly attached with respect to a wall portion 41 of the garage 21. It should be noted that another pivotal mounting means similar to the pivotal mounting means 33, best shown in Figs. 4 and 5, is adapted to be positioned on the opposite side of the door 20 and to be connected to the opposite side receiving channel 25 in the same manner as the connection of the pivotal mounting means 33 to the side receiving channel portion 24 clearly shown in Figs. 4 and 5. This second pivotal mounting means is also provided with a pivot pin similar to that shown at 38 in Figs. 4 and 5 connected through controllable tension-adjustable spring means similar to that indicated generally at 39 in Figs. 4 and 5, to a mounting plate similar to that shown at 40 in Figs. 4 and 5 which is similarly adapted to be fastened to the opposite wall of the garage 21.

Figure 6:
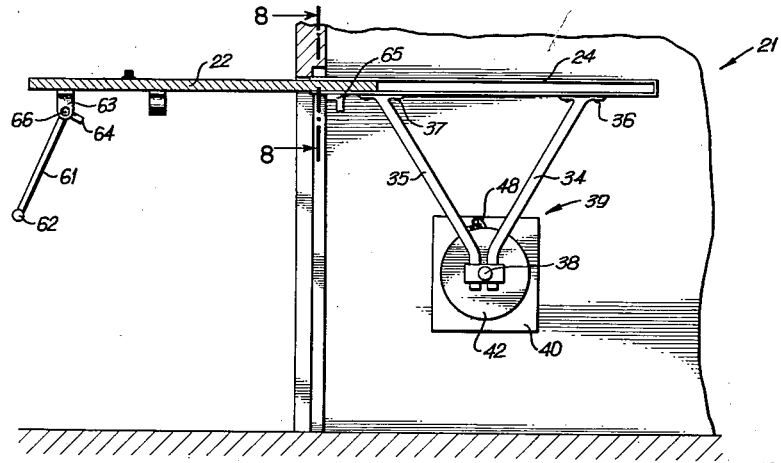
Fig. 6 is a view similar to Fig. 5, but shows the panel member of the door after it has been controllably horizontally extended from the upper horizontal position shown in Fig. 5 outwardly through the door opening into an extended position such as to effectively provide a cantilever type projecting roof structure over an adjacent area outside of the garage.
Figure 12:
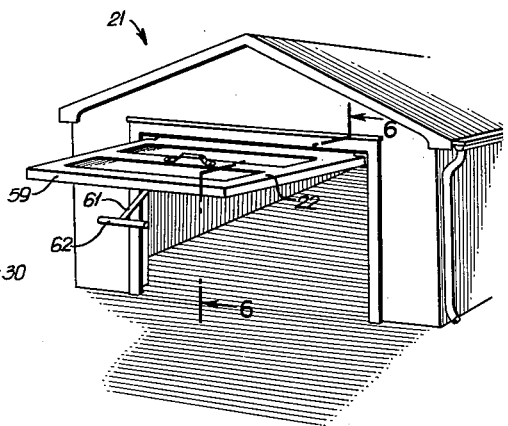
Fig. 12 is a perspective view of the garage and the door when the panel member thereof is in the extended horizontal position shown in Figs. 6 and 11.

In the specific example illustrated, as best shown in Figs. 13–15, the controllably tension-adjustable spring means, indicated generally at 39, may take one exemplary specific form wherein the pivot pin means 38 extends into the housing 42 and is fastened, as indicated at 43, to an inner end of a spiral spring 44, which has its outer end fastened, as indicated at 45, to the wall 46 of the housing 42. It should be noted that the wall 46 of the housing is provided with ratchet means 47 controllably rotatably cooperating with pawl means 48 pivotally carried by the fixed mounting plate 40, whereby the entire housing 42 and the ratchet means 47 carried thereby may be controllably rotated in a clockwise direction, as indicated in Figs. 13 and 14, so as to effectively rotate the ratchet means with respect to the locking pawl means 48 to any desired degree such as to tighten up and/or adjust the tension of the spiral spring 44. This may be necessary after the apparatus has been in use for some time in order to compensate for aging and wear effects on the spring 44, which may cause it to no longer exert sufficient force to effectively counterbalance the door 20. This may also be desirable when the panel member 22 is horizontally extended outwardly from the frame member 23 into the cantilever position shown in Figs. 6, 11, and 12. It should also be noted that by releasing the pawl 48, the ratchet means 47 may be rotated in counterclockwise and spring-tension-decreasing direction to any desired new position, where it may be locked by re-engaging the pawl means 48 with the ratchet means 47. It should be noted that clockwise or spring-tension-increasing rotation of the ratchet means 47 with respect to the pawl means 48 may be facilitated by the tool receiving recess means 49 adapted to receive therein any longitudinal lever member, such as a tire iron, or the like, or any other suitable longitudinal lever member, such as that shown in broken lines at 50, whereby to provide sufficient mechanical advantage to allow the spring tension to be controllably adjusted without requiring the application of great force to said lever member 50 during the adjusting operation.

Figure 8:
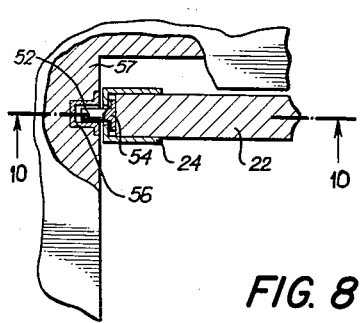
Fig. 8 is a view similar to Fig. 7, but shows the frame locking means in the locked position which it assumes when the panel member of the door is in the controllably extended cantilever or overhanging position shown in Fig. 6, and this view is taken in the direction of the arrows 8—8 of Fig. 6.
Figure 10:
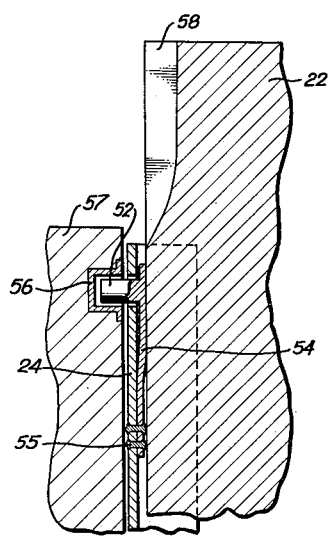
Fig. 10 is an enlarged fragmentary partially sectional view taken in the direction of the arrows 10—10 of Fig. 8.

The hereinbefore-mentioned frame locking means carried by the side receiving channel portions 24 and 25 of the frame member 23 takes one specific form in the example illustrated in the figures, wherein two such frame locking means in the locations indicated generally at 51, are carried, respectively, by each of the two side receiving channel portions 24 and 25 adjacent the open or first ends 26 and 27 of said side receiving channel portions 24 and 25, and each including a horizontal oppositely outwardly directed projection means 52 slidably positioned in a corresponding outwardly directed aperture means 53 defined by the corresponding one of said side receiving channel portions 24 and 25, and each including resilient spring-cam follower means 54 mounting the projection means 52 at one end thereof and fastened as indicated at 55 at the other end thereof inside of the corresponding one of said side receiving channel portions 24 and 25. It should be noted that the portion of each of the resilient spring-cam follower means 54 adjacent the projection means 52 is normally spaced inwardly of the corresponding side channel portions 24 and 25, for abutment by the corresponding one of the side edges 31 and 32 of the panel member 22 when it is slidably extended into the open position shown in Figs. 6, 11, and 12. This is clearly shown in Figs. 8 and 10 wherein each of said projection means 52 has been forced by the corresponding ones of said side edges 31 and 32 of the extended panel member 22 into corresponding fixed recesses 56 adapted to be carried on each side of the frame member 23 by adjacent portions 57 of the garage 21, thus providing an arrangement wherein the door 20, comprising the panel 22 extended in cantilever fashion with respect to the frame 23, will be effectively supported in the extended overhanging cantilever fashion clearly shown in Figs. 6, 11, and 12 by means of positive engagement of the projection means 52 in the fixed recesses 56.

Figure 1:
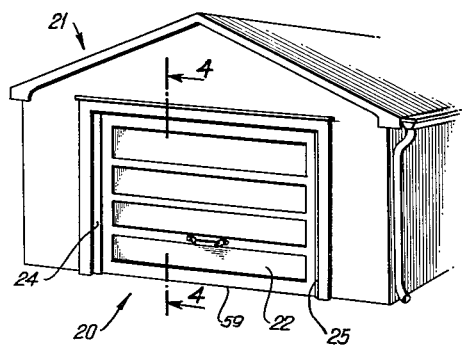
Fig. 1 is a greatly reduced-size perspective view of one exemplary embodiment of the present invention taking the form of a garage door pivotally mounted with respect to a garage for pivotal movement between a vertical position, such as shown in Figs. 1 and 4, through an intermediate position such as shown in Fig. 2, into an upper horizontal position such as shown in Figs. 3 and 5.
Figure 2:
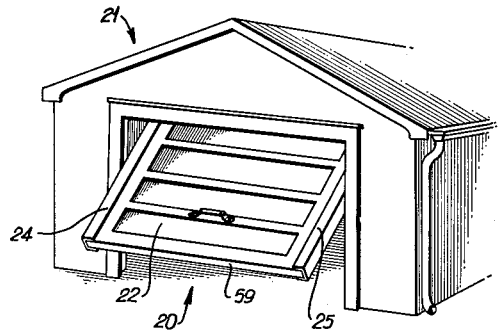
Fig. 2 is a perspective view similar to Fig. 1, but shows the door in an intermediate position.
Figure 7:
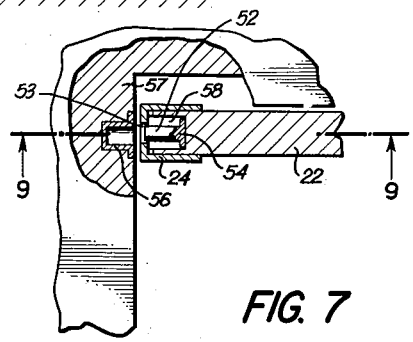
Fig. 7 is a fragmentary view, partly in vertical section as indicated by the arrows 7—7 of Fig. 5, and showing one form of the frame locking means in the normal unlocked position which it maintains when the panel member of the door is in the retracted upper horizontal position shown in Fig. 5.
Figure 9:
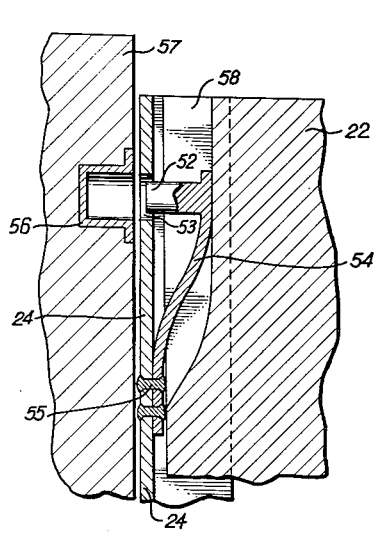
Fig. 9 is an enlarged fragmentary partially sectional view taken in the direction of the arrows 9—9 of Fig. 7.

Each of the side edges 31 and 32 of the panel member 22 is provided with recess means, as indicated at 58 adjacent the edge 59 which is normally the bottom edge of the entire door when it is in the vertical position shown in Figs. 1 and 4; said recess means 58 being so positioned and each being of a size such as to allow each of the spring-cam follower means 54 to be effectively received therein so as to retract the projection means 52 from the fixed recesses 56 when the panel member 22 is fully inserted within the frame member 23 in the position shown in Figs. 1–5. The inward movement of each of the spring-cam follower means 54 into the corresponding recess means 58 is best shown in detail in Figs. 7 and 9. It will be understood that this allows the door 20, comprising the fully engaged panel member 22 and frame member 23, to be pivotally upwardly and downwardly operated in the normal manner because the frame locking means 51 have been rendered inoperative.

One preferred form of the present invention may also include manually operable fastening means releasably fastening the panel member 22 in fully inserted position within the frame member 23. In the example illustrated in the figures, said fastening means is indicated generally at 60 and comprises a longitudinal lever member 61 having a handle 62 at one end and being pivotally mounted at the other end on mounting bracket means 63 and having a laterally directed portion 66 extending to each of the side receiving channel portions 24 and 25 of the frame member 23 where a locking catch member 64 normally lies behind a locking projection 65 carried by the corresponding one of the side receiving channel portions 24 and 25 of the frame member 23, but whereby downward pivotal movement of the lever 61 from the normal position shown, wherein it lies closely against the inside portion of the door panel 22 adjacent the bottom edge 59 thereof, into the lowermost extended position shown in Figs. 6 and 12, causes each locking catch member 64 to be pivotally moved out of engagement with each locking projection 65, whereby the panel member 22 will be effectively released from locking engagement with respect to the frame member 23 so that the application of forwardly directed force to the handle 62 will make it possible to easily move the panel member 22 to the horizontally extended position shown in Figs. 6, 11, and 12, and vice versa. It should be noted that when the panel member 22 is in fully inserted position within the frame member 23 and the lever 61 is held in its normal position closely adjacent to the inside of the panel member 22, each locking catch member 64 will engage the corresponding locking projection 65 and will effectively lock the panel member 22 within the frame member 23.

It should be noted that while the one exemplary form of the present invention has been illustrated in the form of a garage door pivotally mounted with respect to a garage, this is for illustrative purposes only and is not intended to limit the scope of the invention. Actually, the invention may comprise any panel, whether a door or a wall, or the like, pivotally mounted with respect to any structure whether a garage, building, or the like, for movement between a vertical position, an upper horizontal position, and a controllably extended cantilever position. Furthermore, various types of spring means may be employed other than the specific one illustrated herein and various types of fastening means may be employed or the fastening means may be dispensed with entirely in certain modified forms of the present invention, as may the extendable handle associated with said fastening means.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A panel in combination with apparatus for mounting it with respect to a structure for pivotal movement between a vertical position, an upper horizontal position, and an extended horizontal cantilever position, comprising: a panel member having horizontally spaced parallel side edges; a frame member consisting of two horizontally spaced parallel side receiving channel portions open at first ends thereof and defining an opening into said frame member, and a member interconnecting second ends thereof to define a closed end of said frame member, said side receiving channel portions receiving and engaging corresponding ones of said side edges of said panel member through said open end of said frame member and effectively mounting said panel member extending between said side receiving channel portions for controllable slidable extension partially out of said open end of said frame member, said frame member being provided with pivotal mounting means adapted to effectively pivotally mount same about a horizontal axis with respect to a structure for movement of the engaged frame member and panel member between a vertical position and an upper horizontal position; and frame locking means carried by said side receiving channel portions of said frame member adjacent said open end thereof and controllably projecting horizontally therefrom into corresponding fixed receiving recess means adapted to be carried by an adjacent portion of a structure pivotally mounting the frame member when said frame member and said engaged panel member are in said upper horizontal position and said panel member is extended horizontally through said open end of said frame member to a predetermined degree, whereby to effectively support in cantilever fashion said extended panel member with respect to said structure, said frame locking means including horizontally outwardly directed projection means slidably positioned in corresponding outwardly directed aperture means defined by at least one of said side receiving channel portions, and resilient spring-cam follower means mounting said projection means spaced inwardly of at least one of said side receiving channel portions, for abutment by at least one of said side edges of said panel member when it is slidably extended through said open end of said frame member, said side edge of said panel member having recess means therein adjacent to said spring-cam follower means when said panel member is fully inserted through said open end of said frame member thereinto, whereby to allow said spring-cam follower means to retract inwardly said projection means, 2. Apparatus of the character defined in claim 1, including spring means for biasing said pivotal mounting means toward an upper position such as to position said engaged frame member and panel member in said upper horizontal position.

3. Apparatus of the character defined in claim 1, wherein said panel member is provided with manually controllably operable fastening means releasably fastening said panel member in fully inserted position within said frame member.

4. Apparatus of the character defined in claim 3, wherein said manually controllably operable fastening means includes a controllably extendable handle for use in moving said panel member from its normal upper horizontal position horizontally outwardly into its extended horizontal cantilever position.

5. A panel in combination with apparatus for mounting it with respect to a structure for pivotal movement between a vertical position, an upper horizontal position, and an extended horizontal cantilever position, comprising: a substantially flat rectangular panel member having horizontally spaced parallel side edges; a substantially rectangular frame member consisting of two horizontally spaced parallel side receiving channel portions open at first ends thereof and defining an opening into said frame member, and a transverse receiving channel portion interconnecting second ends thereof to define a closed end of said frame member, said side receiving channel portions receiving and engaging corresponding ones of said side edges of said panel member through said open end of said frame member and effectively mounting said panel member extending between said side receiving channel portions for controllable slidable extension partially out of said open end of said frame member, said frame member being provided with pivotal mounting means adapted to effectively pivotally mount same about a horizontal axis with respect to a structure for movement of the engaged frame member and panel member between a vertical position and an upper horizontal position; and two frame locking means carried, respectively, by each of the two side receiving channel portions of said frame member adjacent said open end thereof and controllably projecting oppositely horizontally therefrom into two corresponding fixed recesses adapted to be carried on each side of said frame member by adjacent portions of a structure pivotally mounting the frame member when said frame member and said engaged panel member are in said upper horizontal position and said panel member is extended horizontally through said open end of said frame member to a predetermined degree, whereby to effectively support in cantilever fashion said extended panel member with respect to said structure, each of said frame locking means including a horizontally oppositely outwardly directed projection means slidably positioned in a corresponding outwardly directed aperture means defined by the corresponding one of said side receiving channel portions, and resilient spring-cam follower means mounting said projection means spaced inwardly of said side receiving channel portion, for abutment by the corresponding side edge of said panel member when it is slidably extended through said open end of said frame member, each of said side edges of said panel member having a recess means in the portion thereof adjacent to the corresponding spring-cam follower means when said panel member is fully inserted through said open end of said frame thereinto, whereby to allow said spring-cam follower means to retract inwardly said projection means.

6. Apparatus of the character defined in claim 5, including controllably tension-adjustable spring means for biasing said pivotal mounting means toward an upper position such as to position said engaged frame member and panel member in said upper horizontal position.

7. Apparatus of the character defined in claim 5, wherein said panel member is provided with manually controllably operable fastening means releasably fastening said panel member in fully inserted position within said frame member.

8. Apparatus of the character defined in claim 7, wherein said manually controllably operable fastening means includes a controllably extendable handle for use in moving said panel member from its normal upper horizontal position horizontally outwardly into its extended horizontal cantilever position.

References Cited in the file of this patent
UNITED STATES PATENTS

| 2,177,275 | Bird | Oct. 20, 1939 |
| 2,706,132 | Chaffin | Apr. 12, 1955 |

FOREIGN PATENTS

| 453,604 | Great Britain | Sept. 15, 1936 |